(12) United States Patent
McBurney (10) Patent No.: US 11,619,288 B1
(45) Date of Patent: Apr. 4, 2023

(54) TORQUE CONVERTER WITH COMBINATION COMPONENTS

(71) Applicant: Schaeffler Technologies AG & Co. KG, Herzogenaurach (DE)

(72) Inventor: Craig McBurney, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/523,303

(22) Filed: Nov. 10, 2021

(51) Int. Cl.
*F16H 45/02* (2006.01)

(52) U.S. Cl.
CPC ....... *F16H 45/02* (2013.01); *F16H 2045/021* (2013.01); *F16H 2045/0226* (2013.01); *F16H 2045/0263* (2013.01); *F16H 2045/0284* (2013.01)

(58) Field of Classification Search
CPC .............. F16H 45/02; F16H 2045/0273–0294; F16H 2045/0221–0231; F16H 2045/0263; F16H 2045/0205–0215
See application file for complete search history.

(56) References Cited

U.S. PATENT DOCUMENTS

| 5,622,244 | A | * | 4/1997 | Hansen | F16D 47/06 |
| | | | | | 192/208 |
| 10,408,322 | B2 | * | 9/2019 | Maeda | F16H 45/02 |
| 10,451,158 | B2 | | 10/2019 | Vanni et al. | |
| 11,143,280 | B2 | * | 10/2021 | Cai | F16H 41/28 |
| 2011/0240432 | A1 | * | 10/2011 | Takikawa | F16H 45/02 |
| | | | | | 192/3.29 |
| 2018/0238397 | A1 | * | 8/2018 | Clark | F16F 15/1215 |

* cited by examiner

*Primary Examiner* — Ernesto A Suarez
*Assistant Examiner* — James J Taylor, II
(74) *Attorney, Agent, or Firm* — Volpe Koenig, P.C.

(57) ABSTRACT

A torque converter including: a cover arranged to receive torque; an impeller; a turbine in fluid communication with the impeller; a stator assembly; a lock-up clutch including an axially displaceable piston plate; a vibration damper including an output flange, a retainer plate, and a spring directly engaged with the output flange and retainer plate; a first combination component having a first single unified structure including a first section forming a pilot hub located radially inward of the cover and non-rotatably connected to the cover, and a second section forming a seal plate of the lock-up clutch; and a second combination component having a second single unified structure including a third section forming a shell of the turbine, and a fourth section forming a cover plate of the vibration damper, the fourth section directly engaged with the spring and non-rotatably connected to the retainer plate.

20 Claims, 5 Drawing Sheets

TORQUE CONVERTER WITH COMBINATION COMPONENTS

TECHNICAL FIELD

The present disclosure relates to a torque converter with combination components.

BACKGROUND

Known torque converters use large numbers of individual components for lock-up clutches, turbines, vibration dampers, and vibration absorbers.

SUMMARY

According to aspects illustrated herein, there is provided a torque converter, including: a cover arranged to receive torque and supported for rotation around an axis of rotation; an impeller including an impeller shell connected to the cover and at least one impeller blade; a turbine in fluid communication with the impeller and including a turbine shell and at least one turbine blade; a stator including at least one stator blade axially disposed between the turbine and the impeller; a lock-up clutch including an axially displaceable piston plate; and a combination component having a single unified structure. The single unified structure includes: a first section forming a pilot hub located radially inward of the cover and non-rotatably connected to the cover; and a second section forming a seal plate of the lock-up clutch. The axially displaceable piston plate is axially disposed between the cover and the second section.

According to aspects illustrated herein, there is provided a torque converter, including: a cover arranged to receive torque and supported for rotation around an axis of rotation; an impeller including an impeller shell connected to the cover and at least one impeller blade; a turbine in fluid communication with the impeller; a stator assembly including at least one stator blade axially disposed between the turbine and the impeller; a combination component having a single unified structure. The single unified structure includes: a first section forming a shell of the turbine; a second section forming at least one blade and core ring of the turbine; and a third section; and a vibration damper including the third section, an output flange arranged to non-rotatably connect to an input shaft of a transmission, and at least one spring directly engaged with the third section and the output flange.

According to aspects illustrated herein, there is provided there is provided a torque converter, including: a cover arranged to receive torque and supported for rotation around an axis of rotation; an impeller including an impeller shell connected to the cover and at least one impeller blade; a turbine in fluid communication with the impeller; a stator assembly including at least one stator blade axially disposed between the turbine and the impeller; a lock-up clutch including an axially displaceable piston plate; a vibration damper including an output flange arranged to non-rotatably connect to an input shaft of a transmission, a retainer plate, and at least one spring directly engaged with the output flange and the retainer plate; a first combination component having a first single unified structure, the first single unified structure including a first section forming a pilot hub located radially inward of the cover and non-rotatably connected to the cover, and through which the axis of rotation passes, and a second section forming a seal plate of the lock-up clutch; and a second combination component having a second single unified structure, the second single unified structure including a third section forming a shell of the turbine, and a fourth section forming a cover plate of the vibration damper, the fourth section directly engaged with the at least one spring and non-rotatably connected to the retainer plate.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
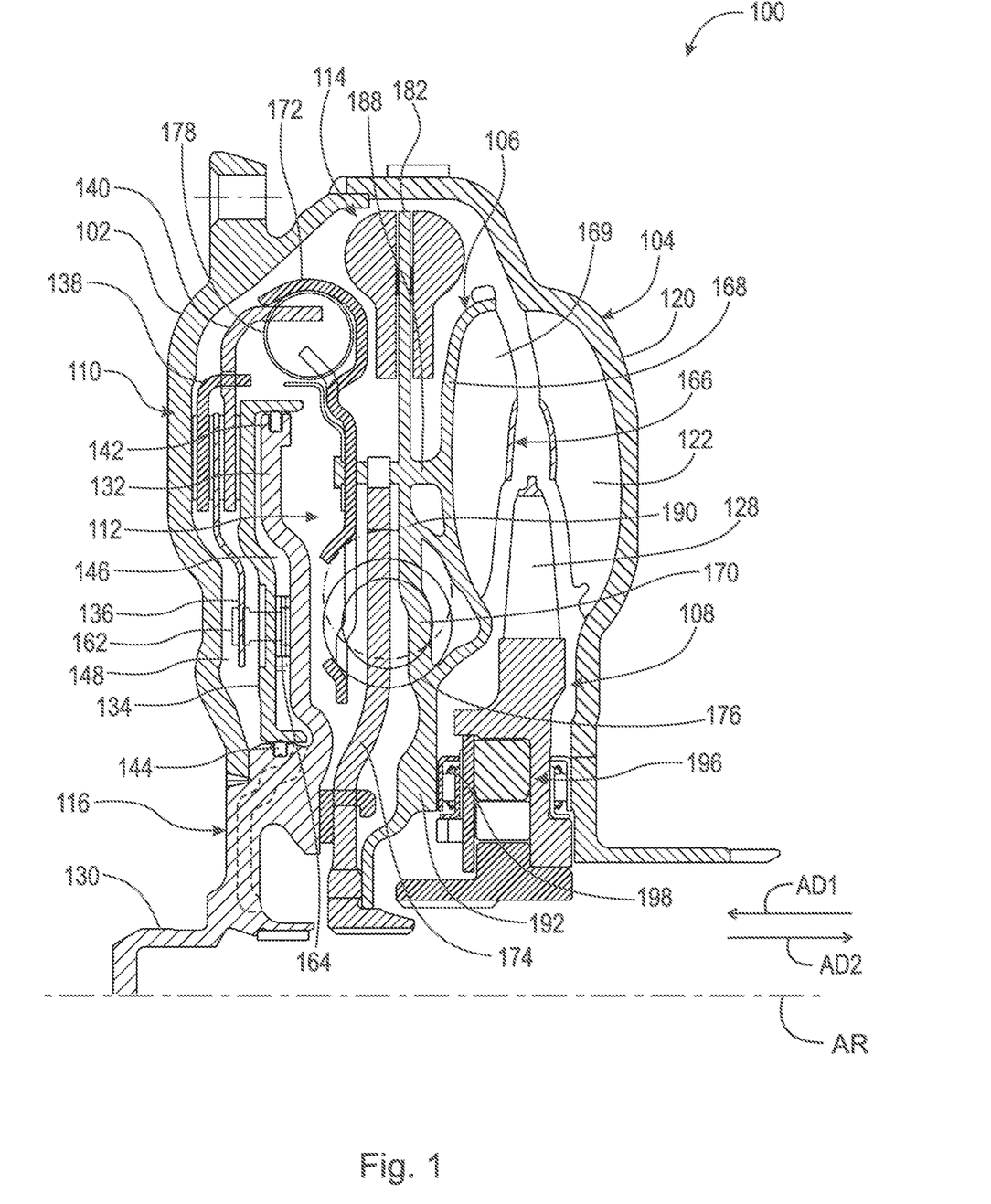
FIG. 1 is a partial cross-sectional view, through a channel for an apply pressure chamber, of a torque converter with a combination component.

FIG. 1 is a partial cross-sectional view, through a channel for an apply pressure chamber, of torque converter 100 with a combination component.

Figure 2:
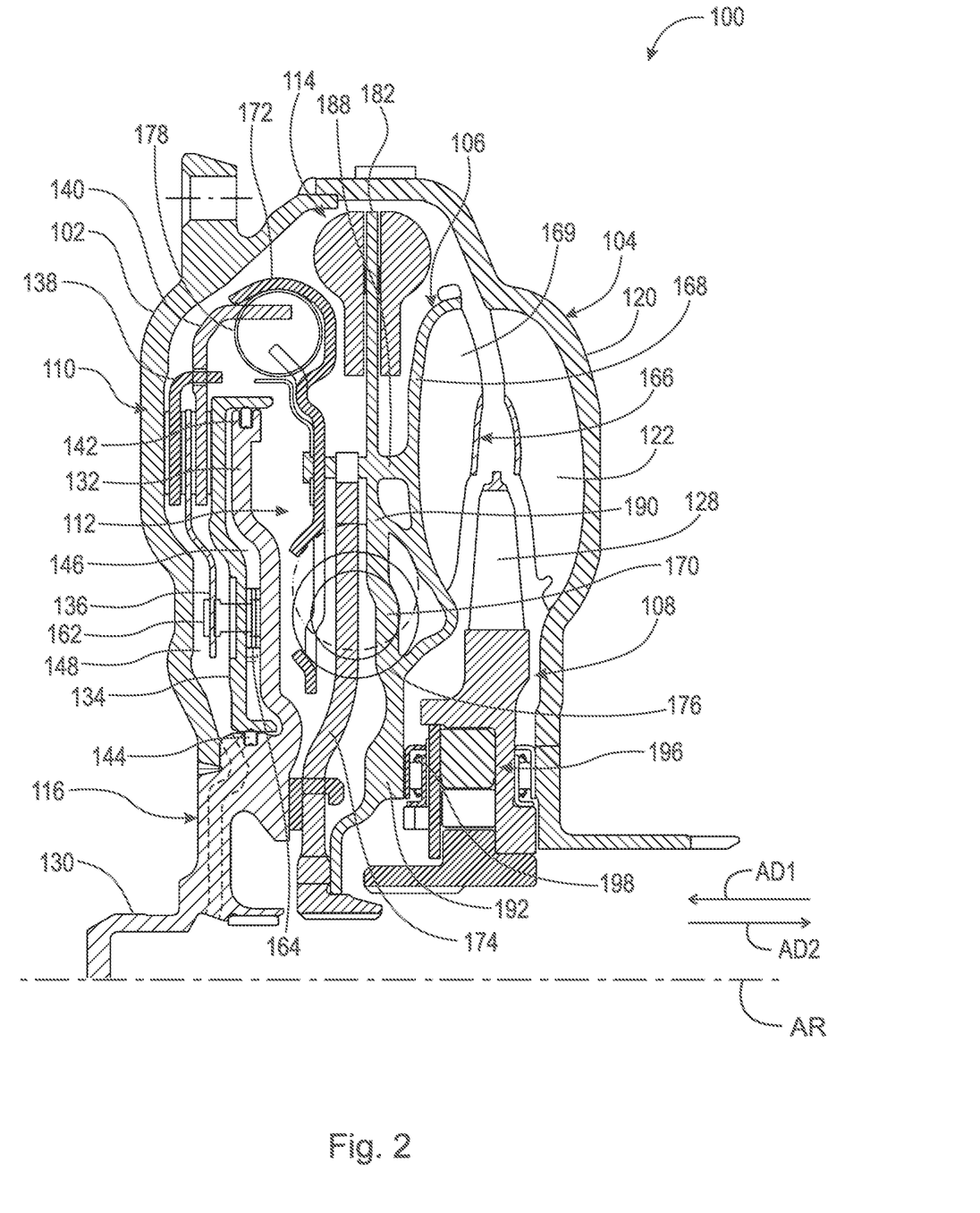
FIG. 2 is a partial cross-sectional view, through a channel for a release pressure chamber, of the torque converter shown in FIG. 1.

FIG. 2 is a partial cross-sectional view, through a channel for a release pressure chamber, of torque converter 100 shown in FIG. 1.

The following should be viewed in light of FIGS. 1 and 2. Torque converter 100 includes: cover 102; impeller 104; turbine 106; stator assembly 108; lock-up clutch 110; vibration damper 112; vibration absorber 114; and combination component 116 consisting of a single unified structure. By "single unified structure" we mean that the component is not a composite of multiple individual portions connected to each other by, for example, by fasteners, welding, or staking.

Cover 102 is arranged to receive rotational torque and is supported for rotation around axis of rotation AR. Impeller 104 includes: impeller shell 120 connected to cover 102; and at least one impeller blade 122 connected to shell 120. Turbine 106 is in fluid communication with impeller 104. Stator assembly 108 includes at least one stator blade 128 axially disposed between impeller 104 and turbine 106. Section 130 of component 116 forms a pilot hub non-rotatably connected to cover 102. Section 130 is located radially inward of cover 102. Axis of rotation AR passes through section 130. At least a portion of section 130 extends past cover 102 in axial direction AD1, parallel to axis of rotation AR.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Section 132 of component 116 forms a seal plate of lock-up clutch 110. Clutch 110 includes: axially displaceable piston plate 134; clutch plate 136; clutch plate 138; and clutch plate 140. Lock-up clutch 110 includes: seal 142 sealed against section 132 and piston plate 134; and seal 144 sealed against piston plate 134 and component 116. Section 132, piston plate 134, and seals 142 and 144 define apply pressure chamber 146. Component 116, cover 102, and piston plate 134 define, at least in part, release pressure chamber 148.

Figure 3:
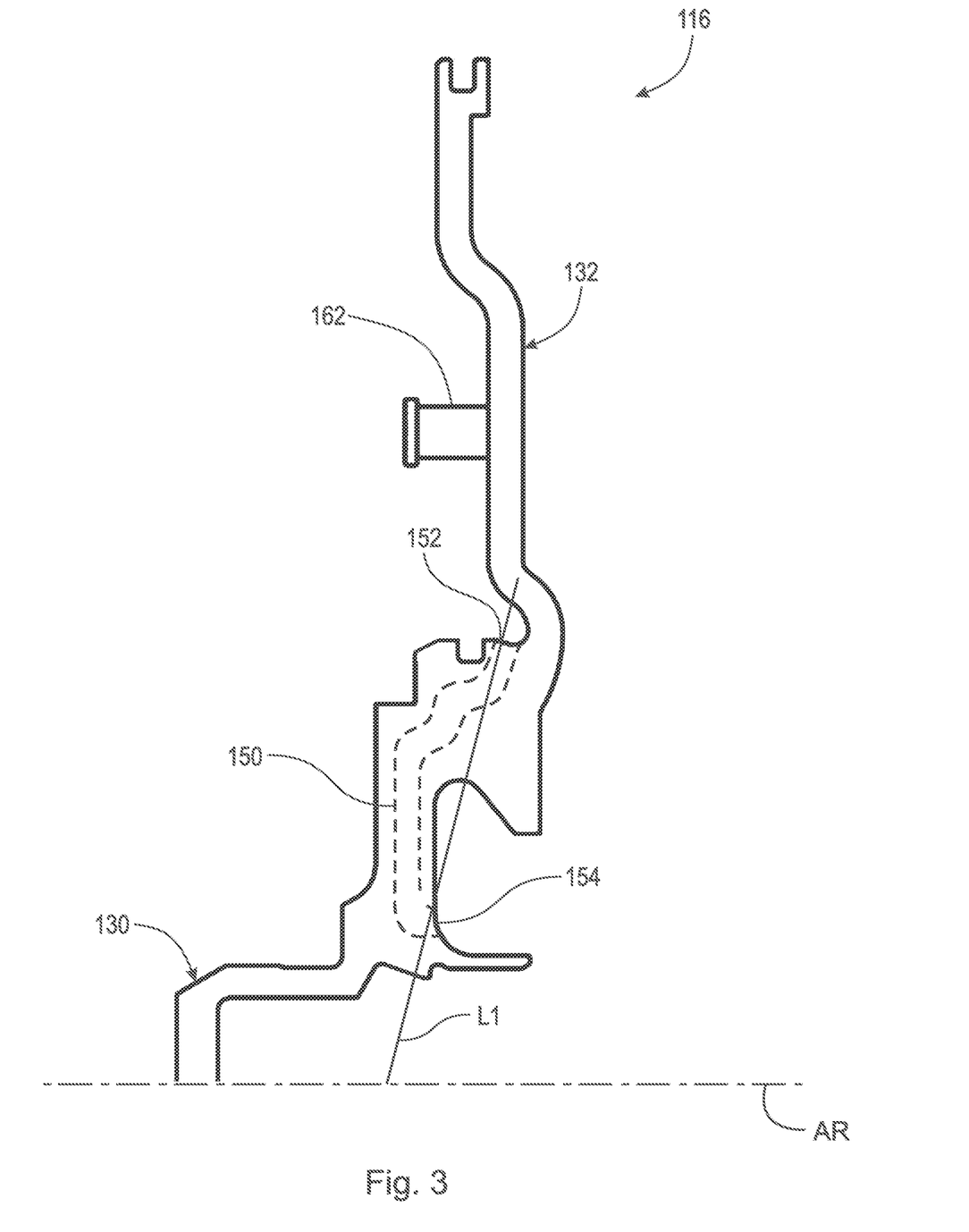
FIG. 3 is a partial cross-sectional view of a combination component as shown in FIG. 1.

FIG. 3 is a partial cross-sectional view of combination component 116 as shown in FIG. 1. The following should be viewed in light of FIGS. 1 through 3. Component 116 defines apply channel 150. Channel 150 includes: end 152 opening to chamber 146; and end 154. In the example of FIG. 1, no straight line connects end 152 and end 154 while remaining wholly disposed in channel 150. Stated differently, channel 150 is not linear between ends 152 and 154. Straight line L1, connecting ends 152 and 154, illustrates the non-linearity of channel 150.

Figure 4:
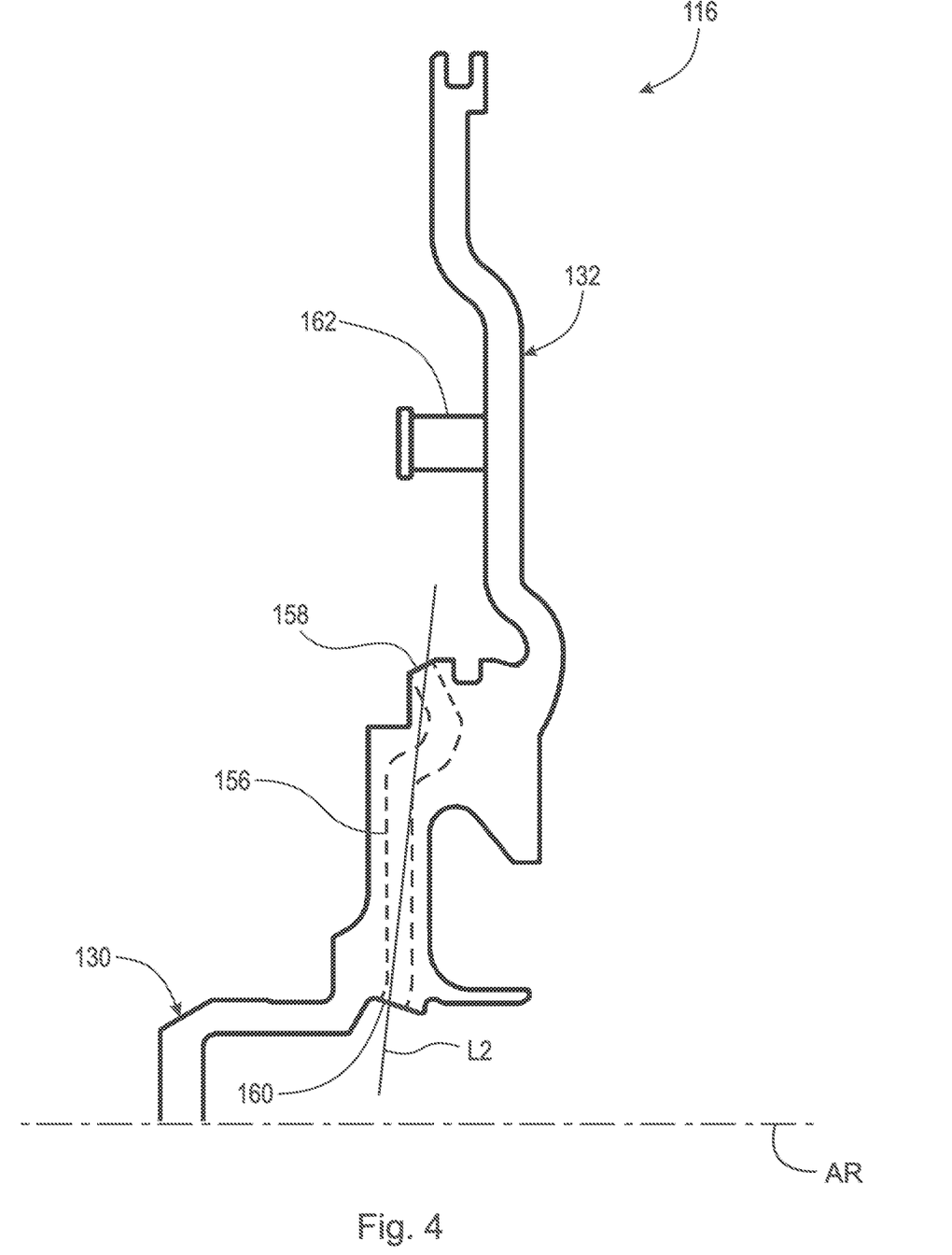
FIG. 4 is a partial cross-sectional view of the combination component as shown in FIG. 2; and, FIG. 5 is a partial cross-sectional view of a combination component shown in FIGS. 1 and 2.

FIG. 4 is a partial cross-sectional view of combination component 116 as shown in FIG. 2. The following should be viewed in light of FIG. 1 through 4. Component 116 defines release channel 156. Channel 156 includes: end 158 opening to chamber 148; and end 160. No straight line connects end 158 and end 160 while remaining wholly disposed in channel 156. Stated differently, channel 156 is not linear between ends 158 and 160. Straight line L2, connecting ends 158 and 160, illustrates the non-linearity of channel 156.

Pressurized fluid is arranged to flow to and from apply chamber 146 through channel 150. The pressurized fluid is arranged to flow into chamber 146 to displace piston plate 134 in axial direction AD1 to non-rotatably connect piston plate 134, clutch plates 136, 138, and 140, and cover 102, and close clutch 110. Torque applied to cover 102 is transmitted directly from clutch 110 to damper 112 when clutch 110 is closed.

Pressurized fluid is arranged to flow to and from release chamber 148 through channel 156. The pressurized fluid is arranged to flow into chamber 148 to displace piston plate 134 in axial direction AD2, opposite direction AD1, to open clutch 110 and enable relative rotation between cover 102 and piston plate 134. Torque applied to cover 102 is transmitted to damper 112 via impeller 104 and turbine shell 106 when clutch 110 is open.

Section 132 includes rivet 162 extending from section 132 in direction AD1 and passing through piston plate 134. Clutch 110 includes leaf spring 164 connected to section 132 and piston plate 134. Clutch plate 136 is fixedly connected to rivet 162. Spring 164 non-rotatably connects section 132 and plate 134, while enabling axial displacement of plate 134 with respect to section 132.

Figure 5:
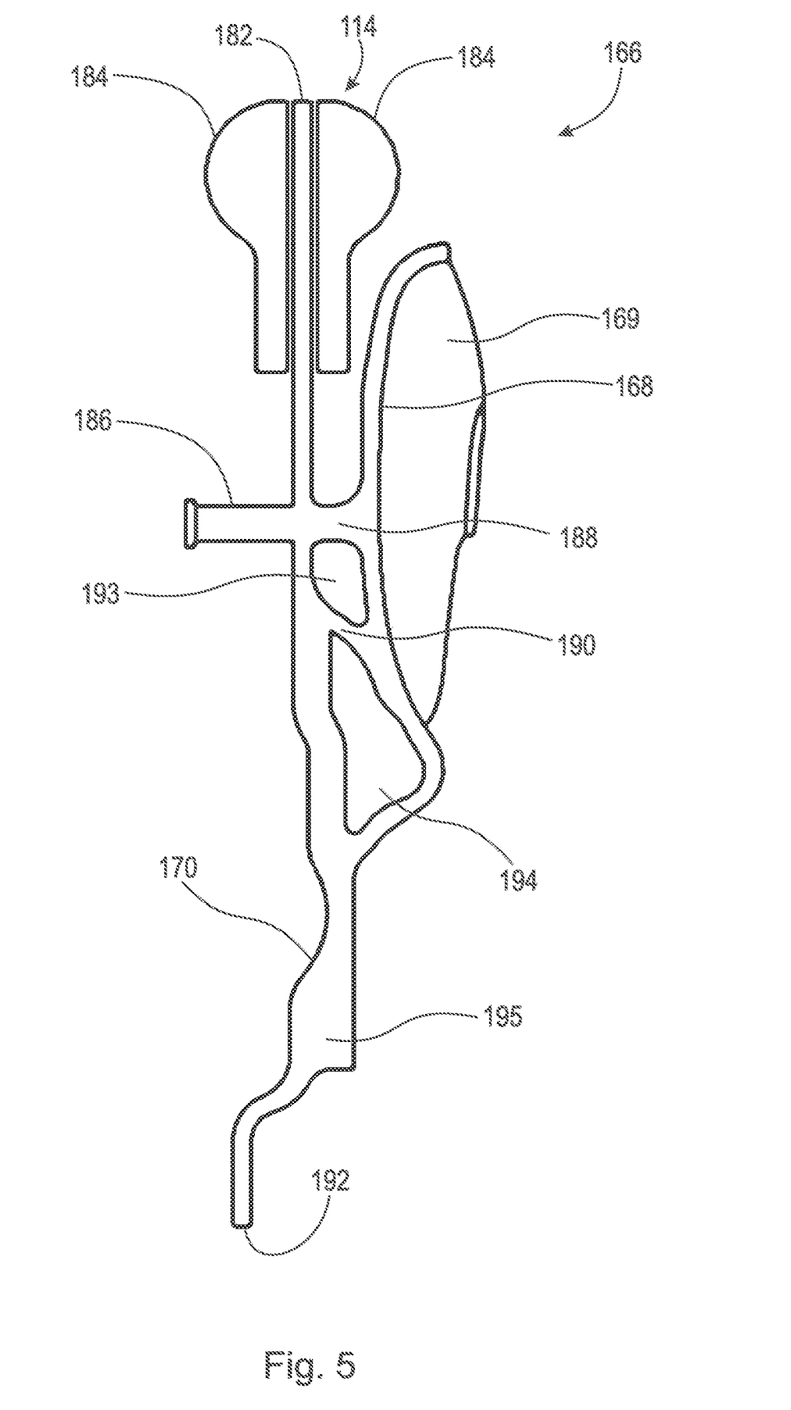

FIG. 5 is a partial cross-sectional view of combination component 166 shown in FIGS. 1 and 2. The following should be viewed in light of FIGS. 1 through 5. Torque converter 100 includes combination component 166. Section 168 of component 166 forms a shell for turbine 106. Section 169 of component 166 forms blades and a core ring for turbine 106. Section 170 of component 166 forms a cover plate for vibration damper 112. Damper 112 includes: retainer plate 172 non-rotatably connected to section 170; output flange 174 arranged to non-rotatably connect to an input shaft of a transmission (not shown); at least one spring 176 directly engaged with section 170, plate 172, and flange 174; and at least one spring 178 directly engaged with clutch plate 140 and plate 172. Output flange 174 is axially disposed between section 170 and plate 172.

By one component "directly engaged with" another component, we mean that the components are in direct contact, or that the components are each in direct contact with one or more ancillary intermediate parts, for example, a cap fixed to an end of a spring, such that the components and the ancillary parts are mechanically solid at the points of contact with the one or more ancillary intermediate parts. For example, a washer or coating could be disposed between the two components.

Combination component 166 includes section 182 forming a center plate of pendulum vibration absorber 114. Absorber 114 includes pendulum masses 184, connected to section 182 and displaceable with respect to section 182 as is known in the art. Combination component 166 includes rivet 186 extending in direction AD1. Rivet 186 passes through output flange 174. Plate 172 is non-rotatably connected to rivet 186. Component 166 includes: section 188 forming a pedestal behind rivet 186; and section 190. Component 166 includes radially innermost distal end 192 in contact with output flange 174. In the example of FIG. 1, combination component 166 defines cavity 193 wholly enclosed by combination component 166. In an example embodiment (not shown), cavity 193 is only partially enclosed by component 166. In the example of FIG. 1, combination component 166 defines pocket 194. Springs 176 are partially disposed in pocket 194.

Component 166 includes section 195, and stator assembly 108 includes one-way clutch 196 and bearing 198 axially disposed between section 195 and one-way clutch 196. Bearing 198 is in contact with section 195.

The following should be viewed in light of FIGS. 1 through 5. The following describes a method of operating a torque converter including a cover, a turbine, an impeller, a vibration damper including an output flange arranged to non-rotatably connect to an input shaft of a transmission, and a lock-up clutch including a piston plate. A first step directly connects a first section of a combination component of the torque converter, the combination component having a unified single structure, with an engine crankshaft, the first section non-rotatably connected to and located radially inward of the cover. A second step receives, with the cover, rotational torque. A third step: flows a first pressurized fluid through a first channel, defined by the combination component, into an apply pressure chamber defined, at least in part, by the piston plate and a second section of the combination component. A fourth step displaces, with the pressurized fluid in the apply pressure chamber, the piston plate in a first axial direction. A fifth step non-rotatably connects the cover and the piston plate. A sixth step transmits the rotational torque from the piston plate to the vibration damper. A seventh step flows a second pressurized fluid through a second channel, defined by the combination component, into a release pressure chamber defined at least in part by the piston plate, the cover, and the combination component. An eighth step displaces, with the second pressurized fluid in the release chamber, the piston plate in a second axial direction, opposite the first axial direction. A ninth step enables relative rotation between the cover and the piston plate.

The following should be viewed in light of FIGS. 1 through 5. The following describes a method of operating a torque converter including a turbine, an impeller, a vibration damper including an output flange arranged to non-rotatably connect to an input shaft of a transmission, and a pendulum vibration absorber. Although the method is presented as a sequence of steps for clarity, no order should be inferred from the sequence unless explicitly stated. A first step receives, with a cover of the torque converter, rotational torque. A second step transmits the rotational torque to the impeller. A third step rotates, with the impeller and a pressurized fluid, a first section and a second section of a combined component of the torque converter having a unified single structure, the first section forming a turbine shell of the turbine, and the second section forming at least one turbine blade and a core ring of the turbine. A fourth step transmits, via a third section of the combined component forming a cover plate of the vibration damper, the rotational torque to a spring of the vibration damper directly engaged with the third section and the output flange. A fifth step transmits the rotational torque from the spring to the output flange. A sixth step rotates, with the impeller and the pressurized fluid, a fourth section of the combination component forming a center plate of the pendulum vibration absorber. A seventh step contacts the output flange with a radially innermost distal end of the combination component. An eighth step centers, with the innermost distal end, the combined component with respect to the output flange. A ninth step urges a fifth section of the combination component against a bearing axially disposed between and in contact with the fifth section and a one-way clutch of the torque converter.

Combination components 116 and 166 reduce a parts count for torque converter 100, simplify assembly of torque converter 100, and enable flexibility in structuring torque converter 100. Component 116 combines the structures of a pilot hub (section 130), seal plate (section 132), and rivet (rivet 162). Component 166 combines the structures of a turbine shell (section 168), turbine blades and core ring (section 169), cover plate (section 170), rivet (rivet 186), centering plate (distal end 192), and center plate of pendulum 114 (section 182). The pedestal of section 188 enables riveting forces to be applied from within turbine 106. Sections 188 and 190 brace section 168 (the turbine shell) to prevent turbine deflection during stall events of torque converter 100. The thickness of components 116 and 166 is varied according to structural and operational requirements. For example: section 195 is thickened to reduce strain and surface stress from contact with bearing 198; and other areas of components 116 and 166 are made thinner to reduce weight, inertia, and cost.

In an example embodiment, components 116 and 166 are formed by 3-D printing.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
L1 straight line
L2 straight line
100 torque converter
102 cover
104 impeller
106 turbine
108 stator assembly
110 lock-up clutch
112 vibration damper
114 vibration absorber
116 combination component
120 impeller shell
122 impeller blade
128 stator blade
130 section, combination component
132 section, combination component
134 piston plate
136 clutch plate
138 clutch plate
140 clutch plate
142 seal
144 seal
146 apply pressure chamber
148 release pressure chamber
150 channel
152 end, channel
154 end, channel
156 channel
158 end, channel
160 end, channel
162 section, combination component 116
162 protrusion
164 leaf spring
166 combination component
168 section, combination component 166
169 section, combination component 166
170 section, combination component 166
172 retainer plate
174 output flange
176 spring
178 spring
182 section, combination component 166
184 pendulum mass
186 protrusion
188 section, combination component 166
190 section, combination component 166
192 distal end, combination component 166
193 cavity
194 pocket
195 section, combination component 166
196 one-way clutch
198 bearing

The invention claimed is:

1. A torque converter, comprising:
a cover arranged to receive torque and supported for rotation around an axis of rotation;
an impeller including:
an impeller shell connected to the cover; and,
at least one impeller blade;
a turbine in fluid communication with the impeller and including:
a turbine shell; and,
at least one turbine blade;
a stator including at least one stator blade axially disposed between the turbine and the impeller;
a lock-up clutch including an axially displaceable piston plate; and,
a combination component having a single unified structure, the single unified structure including:
a first section forming a pilot hub located radially inward of the cover and non-rotatably connected to the cover;
a second section forming a seal plate of the lock-up clutch, wherein the axially displaceable piston plate is axially disposed between the cover and the second section; and
a protrusion extending, parallel to the axis of rotation, from the second section of the combination component between a first radial distal end and a second radial distal end of the combination component, the protrusion passing through the axially displaceable piston plate.

2. The torque converter of claim 1, wherein:
the axis of rotation passes through the first section; or,
at least part of the first section is located past the cover in an axial direction parallel to the axis of rotation, and the axial direction is from the impeller toward the lock-up clutch.

3. The torque converter of claim 1, wherein:
the second section and the axially displaceable piston plate define, at least in part, a pressure chamber; and,
the pressure chamber is arranged to receive a pressurized fluid to displace the axially displaceable piston plate and non-rotatably connect the cover and the axially displaceable piston plate.

4. The torque converter of claim 3, wherein:
the combination component defines a channel with:
a first end; and,
a second end opening to the pressure chamber; and,
no straight line connects the first end and the second end while being disposed entirely in the channel.

5. The torque converter of claim 1, wherein:
the combination component, the axially displaceable piston plate, and the cover define, at least in part, a pressure chamber; and,
the pressure chamber is arranged to receive a pressurized fluid to displace the axially displaceable piston plate and enable relative rotation between the cover and the axially displaceable piston plate.

6. The torque converter of claim 5, wherein:
the combination component defines a channel with:
a first end; and,
a second end opening to the pressure chamber; and,
no straight line connects the first end and the second end while being disposed entirely in the channel.

7. The torque converter of claim 1, wherein:
the lock-up clutch includes a clutch plate fixedly connected to the protrusion and axially disposed between the axially displaceable piston plate and the cover.

8. A torque converter, comprising:
a cover arranged to receive torque and supported for rotation around an axis of rotation;
an impeller including:
an impeller shell connected to the cover; and,
at least one impeller blade;
a turbine in fluid communication with the impeller;
a stator assembly including at least one stator blade axially disposed between the turbine and the impeller;
a combination component having a single unified structure, the single unified structure including:
a first section forming a shell of the turbine;
a second section forming at least one blade and core ring of the turbine;
a third section; and,
an axially extending protrusion disposed radially outside of the third section; and,
a vibration damper including:
the third section;
a retainer plate non-rotatably connected to the axially extending protrusion:
an output flange arranged to non-rotatably connect to an input shaft of a transmission; and,
at least one spring directly engaged with the third section, the retainer plate, and the output flange, the at least one spring being disposed radially inside of the axially extending protrusion.

9. The torque converter of claim 8, wherein:
the output flange is axially disposed between the retainer plate and the third section.

10. The torque converter of claim 8, wherein the combination component includes a radially innermost distal end in contact with the output flange.

11. The torque converter of claim 8, further comprising:
a pendulum vibration absorber including first and second pendulum masses, wherein:
the combination component includes a fourth section forming a center plate of the pendulum vibration absorber; and,
the first and second pendulum masses are connected to the fourth section and are displaceable with respect to the fourth section.

12. The torque converter of claim 8, wherein the stator assembly includes:
a one-way clutch; and,
a bearing axially disposed between the combination component and the one-way clutch and in contact with the combination component.

13. The torque converter of claim 8, wherein the combination component defines a cavity wholly enclosed by the combination component.

14. A torque converter, comprising;
a cover arranged to receive torque and supported for rotation around an axis of rotation; an impeller including:
an impeller shell connected to the cover; and,
at least one impeller blade;
a turbine in fluid communication with the impeller;
a stator assembly including at least one stator blade axially disposed between the turbine and the impeller;
a lock-up clutch including an axially displaceable piston plate;
a combination component having a single unified structure, the single unified structure including:

a first section forming a pilot hub located radially inward of the cover and non-rotatably connected to the cover, and through which the axis of rotation passes; and, a second section forming a seal plate of the lock-up clutch, the seal plate and the axially displaceable piston plate defining, at least in part, a pressure chamber therebetween:

wherein the combination component defines a channel with a first end arranged on a surface of the combination component and a second end arranged on another surface of the combination component and opening to the pressure chamber, the channel includes an at least partially curved shape through the combination component such that no straight line connects the first end and the second end while being disposed entirely within the channel.

15. The torque converter of claim 14, wherein:

the second section and the axially displaceable piston plate define, at least in part, the pressure chamber, and the pressure chamber is arranged to receive a pressurized fluid to displace the axially displaceable piston plate and non-rotatably connect the cover and the axially displaceable piston plate; or, the combination component, the axially displaceable piston plate, and the cover define, at least in part, the pressure chamber, and the pressure chamber is arranged to receive a pressurized fluid to displace the axially displaceable piston plate and enable relative rotation between the cover and the axially displaceable piston plate; or, the combination component includes a protrusion extending, parallel to the axis of rotation, from the second section, and passing through the axially displaceable piston plate, and the lock-up clutch includes a clutch plate fixedly connected to the protrusion.

16. The torque converter of claim 15, further comprising:

a vibration damper including:
an output flange arranged to non-rotatably connect to an input shaft of a transmission;
a retainer plate; and,
at least one spring directly engaged with the output flange and the retainer plate, and a second combination component having a single unified structure, the single unified structure including:
a third section forming a shell of the turbine; and,
a fourth section forming a cover plate of the vibration damper, the fourth section directly engaged with the at least one spring and non-rotatably connected to the retainer plate.

17. The torque converter of claim 16, wherein the second combination component includes:

a fifth section forming at least one blade of the turbine and a core ring of the turbine; or, a radially innermost distal end in contact with the output flange.

18. The torque converter of claim 16, wherein:

the second combination component includes an axially extending protrusion; and, the retainer plate is non-rotatably connected to the axially extending protrusion.

19. The torque converter of claim 16, further comprising:

a pendulum vibration absorber including a first pendulum mass and a second pendulum mass, wherein the second combination component includes a fifth section forming a center plate of the pendulum vibration absorber, to which the first pendulum mass and the second pendulum mass are connected.

20. The torque converter of claim 16, wherein the stator assembly includes:

a one-way clutch; and, a bearing axially disposed between the second combination component and the one-way clutch and in contact with the second combination component.

* * * * *